US007814080B1

(12) United States Patent
Luo et al.

(10) Patent No.: US 7,814,080 B1
(45) Date of Patent: Oct. 12, 2010

(54) GROUPING DATABASE QUERIES AND/OR TRANSACTIONS

(75) Inventors: Gang Luo, Madison, WI (US); Michael W. Watzke, Madison, WI (US); Curt J. Ellmann, Madison, WI (US)

(73) Assignee: Teradata US, Inc., Miamisburg, OH (US)

( * ) Notice: Subject to any disclaimer, the term of this patent is extended or adjusted under 35 U.S.C. 154(b) by 1729 days.

(21) Appl. No.: 10/694,564

(22) Filed: Oct. 27, 2003

(51) Int. Cl.
G06F 7/00 (2006.01)
G06F 17/00 (2006.01)
G06F 17/30 (2006.01)
(52) U.S. Cl. .................. 707/703; 707/687; 707/713
(58) Field of Classification Search .............. 707/2–4, 707/102, 703, 687, 713
See application file for complete search history.

(56) References Cited

U.S. PATENT DOCUMENTS

| | | | | |
|---|---|---|---|---|
| 5,367,675 A | * | 11/1994 | Cheng et al. | 707/2 |
| 6,714,938 B1 | * | 3/2004 | Avadhanam et al. | 707/102 |
| 6,745,180 B2 | * | 6/2004 | Yamanoue | 707/3 |
| 6,829,600 B2 | * | 12/2004 | Gu et al. | 707/3 |

OTHER PUBLICATIONS

Walter, Bernd, Nested Transactions with Muliple Commit Points: An Approach to the Structuring of Advanced Database Applications, Aug. 1984, Tenth Intl. Conf. VLDB.*
Glosser, Cisele, Lesson on Order of Operations With Exponents, Aug. 2000, MathGoodies.*
Motyka, Mark, Introduction to Algebra, Mar. 2001, MathLeague.*
Dayal, Umeshwar, of Nests and Trees: A Unified Approach to Processing Queries that Contain Nested Subqueries, Aggregates, and Quantifiers, 1987, $13^{th}$ Intl. Conf. VLDB.*
A. Reuter, "Concurrency on High-Traffic Data Elements," ACM 0-89791-070-2/82/003/0083, pp. 83-92 (1982).
H.F. Korth, "Locking Primitives in a Database System," Journal of the Association for Computing Machinery, vol. 30, No. 1, pp. 55-79 (Jan. 1983).
D. Gawlick, "Prcessing Hot Spots in High Performance Systems," IEEE, pp. 249-251 (1985).
P. O'Neil, "The Escrow Transactional Method," ACM Transactions on Database Systems, vol. 11, No. 4, pp. 405-430 (Dec. 1986).
C. Mohan et al., "Solutions to Hot Spot Problems in a Shared Disks Transaction Environment," Computer Science, pp. 1-21 (1991).
U.S. Appl. No. 10/121,191, filed Apr. 12, 2002.

* cited by examiner

*Primary Examiner*—Brent Stace
(74) *Attorney, Agent, or Firm*—Trop, Pruner & Hu PC

(57) ABSTRACT

A method and apparatus identifies SQL statements in a first transaction that specify modification operations that are commutative and associative. The SQL statements are combined into one SQL statement, and the one SQL statement is submitted to a database system. Optionally, or alternatively, multiple transactions can be grouped together into one transaction.

20 Claims, 2 Drawing Sheets

GROUPING DATABASE QUERIES AND/OR TRANSACTIONS

BACKGROUND

A database is a collection of stored data that is logically related and that is accessible by one or more users. A popular type of database is the relational database management system (RDBMS), which includes relational tables made up of rows and columns. Each row represents an occurrence of an entity defined by a table, with an entity being a person, place, or thing about which the table contains information. To extract data from, or to update, a relational table, queries according to a standard database query language (e.g., Structured Query Language or SQL) are submitted to the database system. A table (also referred to as a relation) is made up of multiple rows (also referred to as tuples). Each row (or tuple) includes multiple columns (or attributes).

An issue associated with a database system is the occurrence of deadlock among multiple transactions. For transactional consistency, each transaction in a database typically places some locks on relations and views that are involved in the transaction. In some scenarios, the conflicting locks from multiple transactions are placed on the relations in such an order that none of the multiple transactions can precede further—a deadlock condition. A deadlock among transactions reduces the ability of transactions to complete successfully in a database system, and as a result, system performance suffers.

Another issue with database systems is the relatively high overhead associated with database executions in response to queries/transactions. In the data warehouse application, client systems may send large numbers of queries/transactions to a database system. Having to process large numbers of queries/transactions usually causes database system performance to suffer.

SUMMARY

In general, methods and apparatus are provided to group database queries and/or transactions together to enhance efficiency in database system execution. For example, a method includes identifying statements in a first transaction that specify modification operations that are commutative and associative, and combining the identified statements into one statement. The one statement is submitted to the database system.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
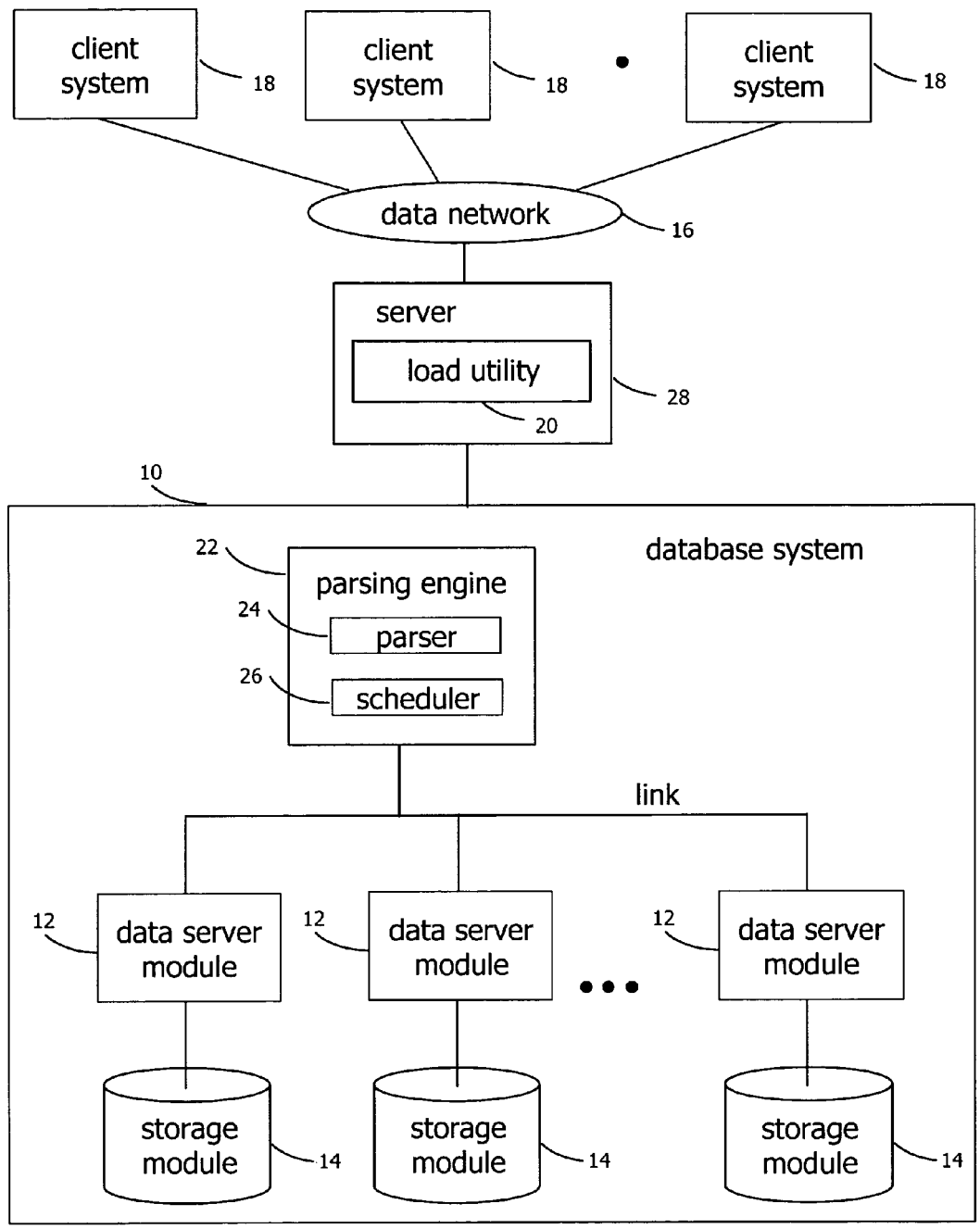
FIG. 1 is a block diagram of an example arrangement that includes a database system coupled to client systems over a data network.

FIG. 1 shows an example arrangement that includes a database system 10, which can be a relational database management system (RDBMS). The database system 10 is a parallel database system having a plurality of data server modules 12, each responsible for managing access to or modification of data stored in respective storage modules 14. Examples of the responsibilities of each data server module (also referred to as "an access module") include locking databases, tables, or portions of tables; creating, modifying, or deleting definitions of tables; inserting, deleting, or modifying rows within tables; retrieving information from definitions and tables; and so forth. The data server modules 12, after executing an action, also return responses to the requesting client. In one example implementation, the data server modules 12 are based on access module processors (AMPs) in TERADATA® database systems from NCR Corporation.

The database system 10 is coupled to a server 28, which in turn is coupled over a data network 16 to one or plural client systems 18. The client systems 18 are capable of issuing queries over the data network 16 to the database system 10. The server 28 includes a load utility 20, which is responsible for grouping transactions and/or Structured Query Language (SQL) statements received from the client systems 18 prior to submission of database transactions to the database system 10. Although reference is made to SQL in the described embodiments, it is contemplated that other embodiments can employ statements according to other database query languages.

The transaction grouping and/or query grouping performed by the load utility 20 reduces the number of transactions and SQL statements that have to be executed by the database system 10, which frees up database system resources for performing other tasks. Instead of being located in the server 28, the load utility 20 can alternatively be located in the database system 10.

In one implementation, the load utility 20 is a continuous load utility that performs substantially continuous loading of data into the database system 10. The load utility 20 receives data from multiple sources (e.g., files, message queues, pipes, and so forth). The load utility 20 then loads data into the database system 10 using update or insert transactions in one or plural sessions. Each update or insert transaction contains one or more modification operations.

In some embodiments, the queries sent by each client system 18 to the database system 10 is according to SQL. Update transactions are specified by UPDATE SQL statements, whereas insert transactions are specified by INSERT SQL statements.

The query originated by a client system 18 and forwarded by the load utility 20 is received by one or plural parsing engines 22 in the database system 10. Each parsing engine includes a parser 24 and a scheduler 26. The parser 24 checks a received request for proper syntax and semantically evaluates the request. The parser 24 also includes an optimizer that develops an execution plan for received requests. The execution plan includes a sequence of executable steps that are communicated by the scheduler 26 to one or more of the data server modules 12 for execution. The parsing engine(s) 22 and data server modules 12 of the database system 10 are part of a database engine, which can be implemented in software, hardware, or a combination of both.

The load utility 20 is considered to be separate from the database engine of the database system 10, even if the load utility 20 is running in the database system 10. The load utility 20 differs from the database engine in that the load utility does not access data objects or other data structures (e.g., tables, views, etc.) stored in the database system 10. The load utility 20 performs designated pre-processing tasks with respect to transactions and/or queries submitted by client systems. The transactions and/or queries, after pre-processing, are submitted by the load utility 20 to the database engine to perform the actual retrieval or manipulation of database objects, such as table rows, columns, tables, views, and so forth.

To access the database system, each client system 18 establishes one or more sessions with the server 28 and/or database system 10. A "session" refers to activity by a user or application over some period of time. The load utility 20 is able to perform partitioning of modification operations such that modification operations operating on the same tuples are sent through the same session. This partitioning reduces the occurrence of deadlocks due to modification operations in multiple sessions performing modification of the same tuples.

In addition, to improve the efficiency of loading data into the database system 10, pre-aggregation is performed, in accordance with some embodiments of the invention, to reduce the number of SQL statements in load transactions (update or insert transactions). Pre-aggregation refers to the grouping of transactions and/or the grouping of SQL statements in transactions. The pre-aggregation is performed by the load utility 20.

Pre-aggregation is especially useful when applied to transactions or queries involving "hot spot" data, which are data elements containing aggregate information that are frequently updated and/or read by many transactions. "Aggregate information" refers to attributes that are aggregated, such as by a summing function (SUM), averaging function (AVG), and so forth. In the banking context, for example, whenever any customer deposits or withdraws money, the balance (aggregated information or attribute) of the entire bank has to be updated. Large numbers of deposits and withdrawals means that this balance is updated a large number of times. The balance of the bank is an example of a data element that is frequently updated and/or read ("hot spot" data). Because a large number of transactions typically read and/or update hot spot data concurrently, hot spot data can easily become a bottleneck in the database system.

Most modification operations on hot spot data are commutative and associative (a mathematical operation in which a result obtained using any two or more elements does not differ with the order in which the elements are used). An example of a commutative and associative operation is increment or decrement (addition or subtraction). Other examples of commutative and associative operations are multiplication and division.

Although described in the context of "hot spot" data, it is noted that the pre-aggregation techniques discussed here (transaction and/or query grouping) can be applied to other types of data, regardless of frequency of access by a database system.

The following example illustrates the pre-aggregation technique according to some embodiments of the invention. In the example, a relation A is a hot spot in the database where A.b contains aggregate information. The following two transactions $T_1$ and $T_2$ are pending in the database system (transaction $T_1$ includes SQL statements $S_1$ and $S_2$, and transaction $T_2$ includes SQL statements $S_3$ and $S_4$).

```
Transaction T₁:
    begin transaction
    S₁: update B
        set B.e = 5
        where B.d = 4;
    S₂: update A
        set A.b = A.b + 1
```

-continued

```
        where A.a = 1;
    end transaction.
Transaction T₂:
    begin transaction
    S₃: select *
        from C
        where C.c = 5;
    S₄: update A
        set A.b = A.b + 2
        where A.a = 1;
    end transaction.
```

A transaction grouping technique is used to group transactions $T_1$ and $T_2$ together into a single transaction $T_3$. In transaction $T_3$, the SQL statements $S_3$ and $S_4$ from transaction $T_2$ are placed after SQL statements $S_1$ and $S_2$ from transaction $T_1$, as follows.

```
Transaction T₃:
    begin transaction
    S₁: update B
        set B.e = 5
        where B.d = 4;
    S₂: update A
        set A.b = A.b + 1
        where A.a = 1;
    S₃: select *
        from C
        where C.c = 5;
    S₄: update A
        set A.b = A.b + 2
        where A.a = 1;
    end transaction.
```

The SQL statements within transaction $T_3$ can be reordered as long as there is no data dependency among those SQL statements. Data dependency between first and second SQL statements exist if the second SQL statement performs an update operation on a tuple (a set of tuples) that is (are) to be changed by the first SQL statement, and the operations by the first and second SQL statements on the tuple(s) are not commutative (this is a write-write data dependency). Similarly, data dependency exists between first and second SQL statements if one SQL statement performs a read of a tuple (or set of tuples) and another SQL statement performs an update of the same tuple (or set of tuples) (this is a read-write/write-read data dependency).

In the example, the positions of SQL statements $S_2$ and $S_3$ can be exchanged. Transaction $T_3$ is thus transformed into transaction $T_4$.

```
Transaction T₄:
    begin transaction
    S₁: update B
        set B.e = 5
        where B.d = 4;
    S₃: select *
        from C
        where C.c = 5;
    S₂: update A
        set A.b = A.b + 1
        where A.a = 1;
    S₄: update A
        set A.b = A.b + 2
        where A.a = 1;
    end transaction.
```

Next, appropriate adjacent SQL statements that update the hot spot data by commutative and associative operations are combined into a single SQL statement. In the example, SQL statements $S_2$ and $S_4$ are combined into a single SQL statement $S_5$. In SQL statement $S_2$, A.b is incremented by 1. In SQL statement $S_4$, A.b is incremented by 2. These two increment operations are commutative and associative, so that their combination produces SQL statement $S_5$ where A.b is incremented by 3 (1+2). Transaction $T_4$ is then transformed into transaction $T_5$.

---

Transaction $T_5$:
    begin transaction
    $S_1$: update B
        set B.e = 5
        where B.d = 4;
    $S_3$: select *
        from C
        where C.c = 5;
    $S_5$: update A
        set A.b = A.b + 3
        where A.a = 1;
    end transaction.

---

Transaction $T_5$ is the final desired transaction. Compared to the original transactions $T_1$ and $T_2$, transaction $T_5$ contains a smaller number of SQL statements because SQL statements $S_2$ and $S_4$, which operate on the hot spot relation A, have been combined into a single operation ($S_5$). Also, the number of transactions have been reduced (from transactions $T_1$ and $T_2$ to transaction $T_5$).

More generally, consider the following two modification operations $O_1$ and $O_2$ that have been combined into a single load transaction T:

$O_1$: update R set R.b=R.b+$b_1$ where R.a=v;
$O_2$: update R set R.b=R.b+$b_2$ where R.a=v;

If $b_3=b_1+b_2$, then transaction T can be transformed into an equivalent transaction T' that contains only a single SQL statement:

update R set R.b=R.b+$b_3$ where R.a=v.

The enhanced transaction grouping technique may have one or more of the following benefits. First, database concurrency is increased. In the above example, assuming the hot spot relation A is cached in memory, then the amount of time that the addition operation (increment of A.b) holds a lock on the hot spot relation A is reduced by about a factor of two.

Grouping transactions and SQL statements also reduces the processing load on the database engine, since the number of SQL statements that need to be processed by the database engine (including the parsing engine 22 and data server modules 12 in the database system) is reduced. Note transaction and/or query grouping are performed before transactions are sent to the database engine (so that transaction and/or query grouping do not touch the actual data objects). The load utility 20 can use efficient compiler techniques to perform the transaction and/or query grouping. Processing a SQL statement in the database system typically requires time-consuming operations such as acquisition and release of locks and semaphores, traversing indices to find a desired data page, processing various page and record formats, and so forth. Such overhead in the database system can be reduced by reducing the number of SQL statements submitted to the database system.

In the extreme case, if the SQL statement $S_4$ in transaction $T_2$ (above) is replaced by the following SQL statement $S_4$':
    update A
    set A.b=A.b−1
    where A.a=1, then the SQL statements $S_2$ and $S_4$' will be combined into an empty SQL statement $S_5$' in transaction $T_5$, since (1+(−1)=0). In this case, the benefits of transaction and query grouping are further increased, since transaction $T_5$ does not need to acquire any lock on the hot spot relation A, and there is no need for the database engine to process the empty SQL statement $S_5$'.

Figure 2:
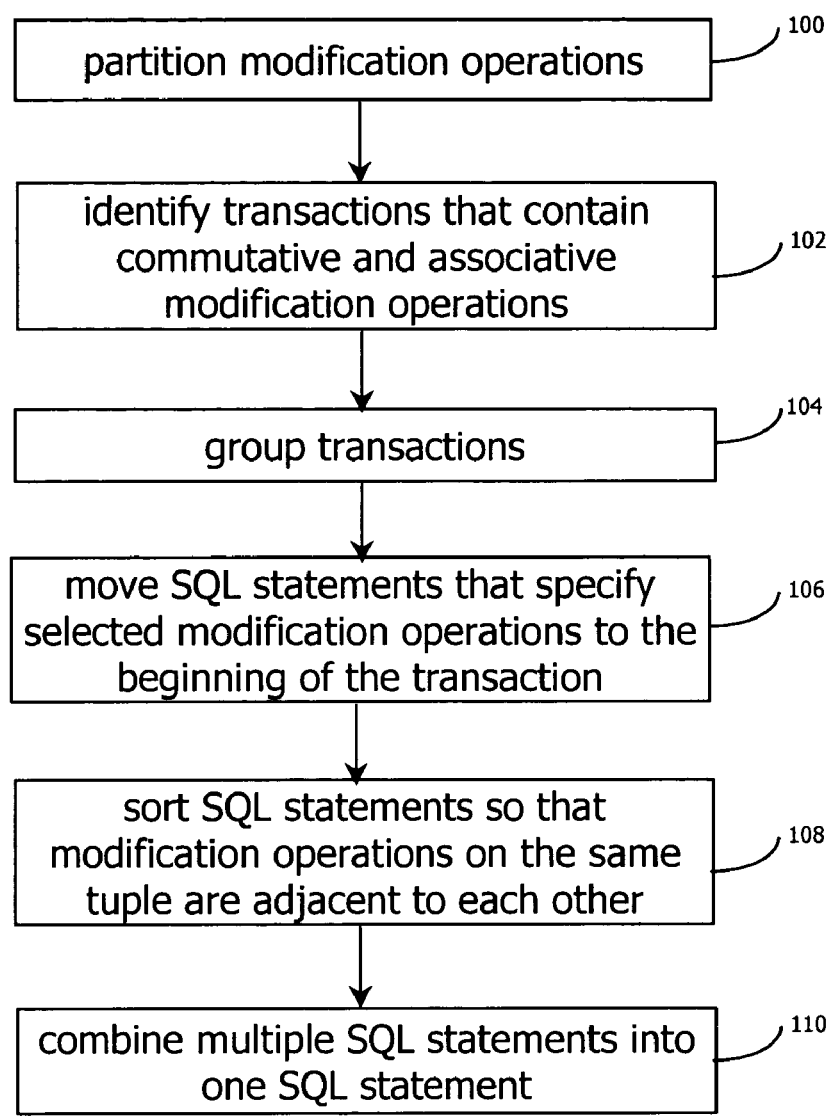
FIG. 2 is a flow diagram of a pre-aggregation process according to some embodiments of the invention.

FIG. 2 illustrates a process according to some embodiments for improving database performance in the processing of SQL statements in several transactions that are submitted by a client system 18 to the database system 10. In some embodiments, the process of FIG. 2 is performed by the load utility 20. However, in other embodiments, the process of FIG. 2 can be performed by the parsing engine 22 or other component in the database system 14.

First, a partitioning method is performed (at 100) by the load utility 20. As noted above, the load utility 20 can open multiple sessions to the database system 10 to perform transactions. Suppose the load utility 20 opens k>2 sessions $SE_i$ (1<i<k) to the database system. If modification operations are randomly distributed among the k sessions, transactions from different sessions can easily deadlock on their X lock requests on the base relations. An X lock is an exclusive lock placed on a table or portion of a table (such as a tuple) when one transaction is updating the table or table portions, to prevent access of the table or table portion by another transaction. The following example invokes a single base relation R and the following four operations (a tuple refers to a row of a table):

$O_1$: Update tuple $t_1$ in base relation R.
    $O_2$: Update tuple $t_2$ in base relation R.
    $O_3$: Update tuple $t_2$ in base relation R.
    $O_4$: Update tuple $t_1$ in base relation R.

These operations require the following tuple-level locks on base relation R:

$O_1$: A tuple-level X lock on R for tuple $t_1$.
    $O_2$: A tuple-level X lock on R for tuple $t_2$.
    $O_3$: A tuple-level X lock on R for tuple $t_2$.
    $O_4$: A tuple-level X lock on R for tuple $t_1$.

Suppose operations $O_1$ and $O_2$ are combined into transaction $T_1$ that is sent through session $SE_1$. Operations $O_3$ and $O_4$ are combined into transaction $T_2$ that is sent through session $SE_2$. If transactions $T_1$ and $T_2$ are executed in the order $T_1$ executes $O_1$,
    $T_2$ executes $O_3$,
    $T_1$ executes $O^2$,
    $T_2$ executes $O_4$, then a deadlock will occur. This is because both operations $O_1$ and $O_4$ require a tuple-level X lock on R for tuple $t_1$. Also, both operations $O_2$ and $O_3$ require a tuple-level X lock on R for tuple $t_2$.

A simple solution to the above deadlock problem is to partition (e.g., hash) the tuples among different sessions so that modification operations on the same tuple are always sent through the same session. In this way, the deadlock condition (transactions from different sessions modifying the same tuple) can be avoided. Effectively, the transactions that operate on the same set of one or more tuples are identified and re-allocated (partitioned) to the same session.

After any partitioning is performed, the load utility 20 identifies (102) those transactions containing commutative and associative operations on hot spot data, such as aggregate attribute values (attributes that are summed, averaged, or subject to any other aggregate function). Such transactions are candidates for transaction grouping. SQL statements that use the same commutative and associative operations to update the same hot spot data are referred to as homogenous SQL statements. Note that increment and decrement operations are regarded as the same commutative and associative operation. Similarly, multiplication and division are regarded as the same commutative and associative operation. Candidate transactions containing homogenous SQL statements are called homogenous candidate transactions.

The identified homogenous candidate transactions are grouped (at 104), such that homogenous candidate transactions $T_1, T_2, \ldots,$ and $T_n$ are grouped into a single transaction T. In transaction T, the SQL statements from transaction i+1 are placed after the SQL statements from transaction i ($1 \leq i \leq n-1$). In a grouped transaction, the SQL statements specifying selected modification operations are moved to the beginning of the transaction (at 106), according to one implementation. Note that the SQL statements specifying the selected modification operations can be moved to other parts of the transaction.

The selected modification operations include modification operations that increment and/or decrement aggregate attribute values, or that perform multiplication or division on the aggregate attribute values. Each such modification operation 0 can be represented as <a, b>, where a denotes the tuple (or set of tuples) to be modified, and b denotes the amount that will be added to (or subtracted from), or multiplied to (or divided from) the aggregate attribute value(s) of the tuple(s).

Next, the load utility 20 sorts (at 108) such SQL statements so that the modification operations on the same tuple (or set of tuples) are adjacent to each other. Note that the order of SQL statements in a transaction T can be moved only if no data dependency exists. Data dependency can be detected using standard compiler algorithms. The goal of the moving and sorting of acts 106 and 108 is to move homogenous SQL statements in a transaction T next to each other.

In transaction T, homogenous SQL statements that are adjacent to each other are combined (at 110) into a single SQL statement. If the combined SQL statement is an empty SQL statement, then it is dropped from the transaction T. Among modification operations specified by the homogenous SQL statements, multiple adjacent modification operations <a, $b_1$>, <a, $b_2$>, ..., and <a, $b_m$> on the same tuple (or set of tuples) are combined into a single modification operation <a, c>, where $c=b_1+b_2+\ldots+b_m$ (or $c=b_1*b_2*b_m$). In the extreme case where c is equal to zero, the single modification operation <a, c> can be omitted.

The pre-aggregation performed by the load utility 20 or other component is effectively performed prior to any operation on relations or tuples by the database engine in the database system 10. Thus, the pre-aggregation is not performed on relations (such as intermediate results or logs) inside the database engine. The pre-aggregation is performed without manipulating relations, which helps to reduce consumption of database system resources.

Instructions of the various software routines or modules discussed herein (such as the load utility 20, the database engine, and so forth) are executed on corresponding control modules. The control modules include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software routines or modules) are stored on one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software routines or modules are loaded or transported to a system in one of many different ways. For example, code segments including instructions stored on floppy disks, CD or DVD media, a hard disk, or transported through a network interface card, modem, or other interface device are loaded into the system and executed as corresponding software modules or layers. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   establishing multiple sessions with a database system, each session associated with at least one transaction;
   identifying transactions that operate on the same set of one or more tuples;
   re-allocating transactions between or among the sessions such that the identified transactions that operate on the same set of one or more tuples are allocated to one of the sessions;
   identifying statements in a particular one of the transactions that specify modification operations that are commutative and associative;
   combining the identified statements into one statement; and
   submitting the one statement to the database system.

2. The method of claim 1, wherein identifying the statements comprises identifying Structured Query Language (SQL) statements.

3. The method of claim 1, wherein combining the identified statements is performed prior to submitting the one statement to the database system.

4. The method of claim 1, further comprising grouping plural ones of the transactions into the particular transaction.

5. The method of claim 4, wherein establishing the multiple sessions, identify the transactions, re-allocating the transactions, identifying the statements, combining the identified statements, submitting the one statement, and grouping the plural transactions are performed by a module separate from a database engine of the database system.

6. The method of claim 1, wherein establishing the multiple sessions, identifying the transactions, re-allocating the transactions, identifying the statements, combining the identified statements, and submitting the one statement are performed by a module separate from a database engine of the database system.

7. The method of claim 6, wherein identifying the statements, combining the identified statements, and submitting the one statement are performed by the module without first accessing data in relational tables.

8. The method of claim 1, further comprising switching an order of statements in the particular transaction to place the identified statements adjacent to each other.

9. The method of claim 8, further comprising determining whether data dependency exists between or among the identified statements prior to switching the order of the identified statements.

10. The method of claim 1, wherein identifying the statements comprises identifying statements $<t, b_1>$ through $<t, b_m>$, m being greater than 1, where t represents a set of one or more tuples, and $b_1$ through bm represent respective modification operations on the set of one or more tuples, and wherein combining the identified statements comprises combining the identified statements into statement $<t, c>$, where c represents an aggregation of $b_1$ through $b_m$.

11. The method of claim 10, wherein combining the identified statements comprises combining the identified statements into statement $<t, c>$, where c represents an addition $b_1$ through $b_m$.

12. The method of claim 10, wherein combining the identified statements comprises combining the identified statements into statement $<t, c>$, where c represents a multiplication of $b_1$ through $b_m$.

13. A system comprising:
an interface to receive first queries from a client system;
one or more processors; and
a software utility executable on the one or more processors to:
establish plural sessions with a database system, each session associated with at least one transaction;
identify transactions that operate on the same set of one or more tuples;
re-allocate transactions between or among the sessions such that the identified transactions that operate on the same set of one or more tuples is allocated to one of the sessions;
identify first queries of a particular one of the transactions that specify commutative and associative operations, and
group the identified first queries into a second query.

14. The system of claim 13, wherein the statements comprises Structured Query Language (SQL) statements.

15. The system of claim 13, wherein the controller is adapted to send the second query to a database engine of the database system.

16. The system of claim 15, wherein the controller is adapted to group the identified first queries prior to submitting the second query to the database engine.

17. The system of claim 13, wherein the software utility is executable to group plural transactions into the particular transaction.

18. The system of claim 13, wherein the identified first queries comprise statements $<t, b_1>$ through $<t, b_m>$, m being greater than 1, where t represents a set of one or more tuples, and $b_1$ through bm represent respective modification operations on the set of one or more tuples, and wherein the second query comprises statement $<t, c>$, where c represents an aggregation of $b_1$ through $b_m$.

19. The system of claim 18, wherein c represents an addition of $b_1$ through $b_m$.

20. The system of claim 18, wherein c represents a multiplication of $b_1$ through $b_m$.

* * * * *